United States Patent [19]

Watkins et al.

[11] 4,208,245
[45] Jun. 17, 1980

[54] PYROLYSIS OF SPENT PULPING LIQUORS

[75] Inventors: John J. Watkins, Pensacola, Fla.; Winfried G. Timpe, deceased, late of Pensacola, Fla., by Ursula H. Timpe, executrix

[73] Assignee: St. Regis Paper Company, New York, N.Y.

[21] Appl. No.: 940,174

[22] Filed: Sep. 7, 1978

Related U.S. Application Data

[63] Continuation of Ser. No. 765,086, Feb. 3, 1977, abandoned.

[51] Int. Cl.² .............................................. D21C 11/14
[52] U.S. Cl. ...................................... 162/31; 201/25; 423/207; 423/242; 423/DIG. 3
[58] Field of Search .................... 162/30 R, 30 K, 31, 162/36; 201/25, 27, 29; 48/209; 423/242, 207, DIG. 3

[56] References Cited

U.S. PATENT DOCUMENTS

| 3,884,751 | 5/1975 | Hess et al. | 162/31 |
| 3,944,462 | 3/1976 | Hess et al. | 162/31 |

FOREIGN PATENT DOCUMENTS 1407429 9/1975 United Kingdom ...................... 162/36

OTHER PUBLICATIONS

Timpe et al., "Tappi", vol. 56, #8, 8/73 p.100-103.

*Primary Examiner*—William F. Smith
*Attorney, Agent, or Firm*—Woodling, Krost & Rust

[57] ABSTRACT

The present invention discloses a process of pretreating a waste black liquor which results from the pulping of various vegetative fibers and wherein the pulping liquor contains as its active pulping ingredient sodium and sulfur with the pretreatment taking place prior to the subjecting of the waste black liquor to a hydropyrolysis reaction. The method and the materials used in the pretreatment are derived from the reaction products resulting from the hydropyrolysis reaction. The pretreatment serves to enable one to regenerate the inorganic chemical values a pulping liquor in an easy and economical manner and the pretreatment, also, serves to appropriately adjust the physical and chemical characteristics of the char produced in the hydropyrolysis reaction. This is accomplished primarily by utilizing the products resulting from the hydropyrolysis reaction.

17 Claims, 4 Drawing Figures

PYROLYSIS OF SPENT PULPING LIQUORS

This is a continuation of application Ser. No. 765,086, filed Feb. 3, 1977, abandoned.

The hydropyrolysis of spent pulping liquors resulting from the pulping of various vegetative fibrous structures is known in the art. Hydropyrolysis involves the heating under high temperatures and pressures for various time intervals, the spent or waste pulping liquor which produces a reaction product which includes a char-slurry mixture and various uncondensable organic gases. The objective in hydropyrolysis is to separate the organic values from the inorganic values in the waste liquor. The inorganic values are normally used in the regeneration of a pulping liquor and the organic values are used for the generation of energy or the production of other useful products. One of the other useful products which may be produced from the organic values is activated carbon.

In the so-called kraft pulping process, wood of various species is reacted with an aqueous solution of sodium hydroxide and sodium sulfide, which are the active ingredients, and lesser amounts of sodium carbonate, sodium sulfate and other salts which fail to convert to active ingredients in the chemical preparation steps of the pulping chemicals. In the hydropyrolysis of kraft waste black liquor the object is to separate the sodium and sulfur from the organic materials derived from the wood and to recover the sodium and sulfur in forms suitable for the regeneration of the pulping chemicals.

The present invention teaches a process of pretreating the incoming waste black liquor from the kraft pulping process with chemicals derived from the hydropyrolysis reaction, so that the filtrate which is separated from the char produced as a result of the hydropyrolysis reaction, is more like the so-called green liquor from the conventional process. The pretreatment of the waste black liquor adjusts the nature of the green liquor so that it can be converted to the so-called white liquor. The conversion of the green liquor to the white liquor is made primarily by reacting lime ($Ca(OH)_2$) with the green liquor, which includes sodium carbonate and sodium bicarbonate, to produce sodium hydroxide and calcium carbonate.

The pretreatment of the waste black liquor prior to its entering the hydropyrolysis reaction, also, affects the physical characteristic of the final char produced. For the sake of example only, without the pretreatment of the present invention the resulting char may be very unmanageable in the sense that it may be quite viscous or sticky. With the pretreatment, the problems are obviated.

In some instances the char, which is produced by the hydropyrolysis reaction, contains too high a percentage of sodium which leaves too much ash in the furnace in the event it is burned as a fuel. The present invention discloses a method of generating a chemical to wash the sodium from the char which chemical is a product of the hydropyrolysis reaction.

The present disclosure, by way of pointing out one of the best modes of carrying out the teachings of the present invention, portrays the invention as it specifically relates to the treatment of spent liquors from a kraft pulping process; however, it will be apparent to those skilled in the art that the invention as equally relates to improvements in those hydropyrolysis reactions where waste liquor is treated which utilizes sodium and sulfur compounds as pulping agents. Such other processes include, but are not limited to:

1. The polysulfide pulping process, in which a portion of the sulfur is present as polysulfide, $Na_2S_x$.
2. The hydrogen sulfide pretreatment pulping process, in which at least a portion of the sulfur in the form of hydrogen sulfide gas is impregnated into the wood prior to heating with an alkali.
3. The sulfite pulping process, in which the pulping mixture contains sodium sulfite and free sulfur dioxide. Base elements other than sodium may be employed such as calcium, magnesium or ammonia.
4. The bisulfite pulping process, which employes sodium (or calcium, magnesium, ammonium) bisulfite and no excess sulfur dioxide.
5. The neutral sulfite semichemical process, which uses sodium (magnesium, ammonium) sulfite buffered with sodium carbonate.
6. The green liquor semichemical process, which uses sodium carbonate and sodium sulfide.

All of the above pulping processes and the many other variants and hybrid processes can be used to pulp materials other than wood. The starting material may be sugar cane bagasse, straw, reeds, grasses, flax or any vegetative fibrous structure. In every case, pulping results in a spent liquor containing dissolved organic matter and the constituents of the pulping solution. Hydropyrolysis is applicable to processing all of these spent liquors, and the improvements disclosed in the present disclosure are applicable in all instances to the waste liquors discussed.

Other objects and a fuller understanding of this invention may be had by referring to the following description and claims, taken in conjunction with the accompanying drawings, in which:

The improvements to which the present invention relate will be specifically described in conjunction with the pretreatment of waste black liquor from the kraft pulping process prior to the liquor being subjected to a hydropyrolysis reaction. The treatment is made by materials produced from the products of the hydropyrolysis reaction. In the process disclosed in the flow sheet of FIG. 1, waste black liquor from a kraft pulping mill at about 25 percent solids is treated by mixing it with the $NaHSO_3$—$Na_2SO_3$ solution leaving the acid wash stage of the filtration and acid washing system. The black liquor is then introduced into a heat exchange system under a pressure of about 3000 psig, heated to a temperature in a range of from 630° F. to 640° F., reacted, cooled to about 250° F. and separated into a vapor and a char-slurry product. The char-slurry product is then separated into a char and a liquid (filtrate) and the char is then washed in two stages with water and in one stage with the acid stream leaving the sulfur recovery system.

Figure 1:
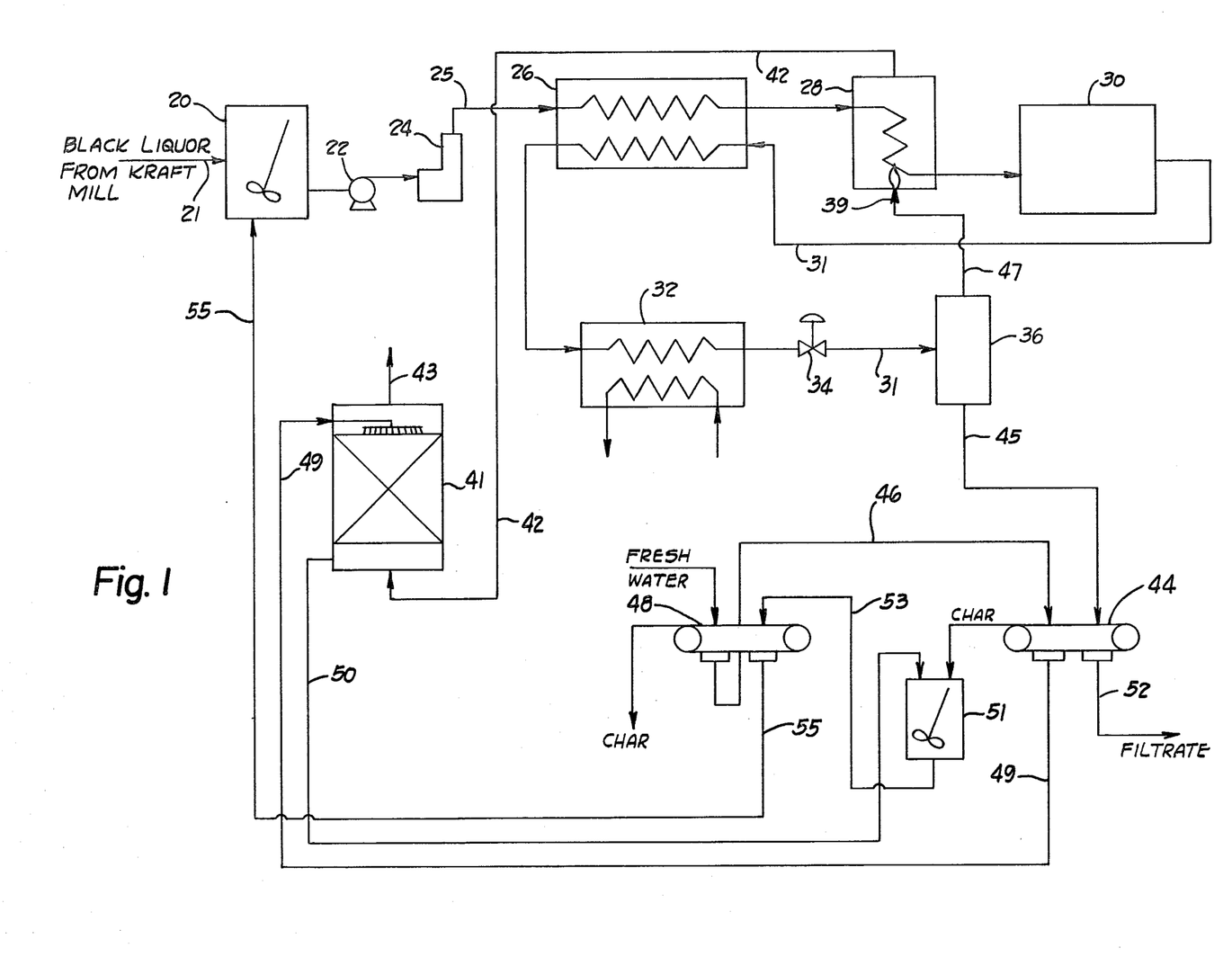
FIG. 1 is a flow sheet illustrating the teachings of pretreating the waste black liquor from a kraft pulping process with a material produced from the hydropyrolysis reaction and includes the acid washing of the char to reduce the sodium content.

The vapor product is separated into a condensate and a gas. The gas is then burned or combusted so that energy and sulfur can be recovered. The liquid (separated from the char product) can then be sent to a clarifier and from it a filtrate results, essentially free of undissolved carbon, which is then reconstituted to an effective pulping liquor.

Referring specifically to the flow sheet shown in FIG. 1, it will be seen that waste black liquor from a kraft pulping process is introduced through 21 into a treatment tank 20, which is mechanically agitated and from there the black liquor (through 25) is introduced into hydropyrolysis reactor 30 by means of a transfer pump 22, a high pressure pump 24 and through a cross heat exchanger 26 and a preheater 28. The conditions and parameters of the hydropyrolysis reaction per se are known to those skilled in the art and are disclosed in U.S. Pat. No. 3,762,989 issued Oct. 2, 1973, in the name of Winfried G. Timpe. The parameters and disclosures of this patent are incorporated into the present teachings and illustrate the hydropyrolysis of waste black liquor from a kraft pulping process. The incoming waste black liquor is pretreated in the treatment tank 20 with chemicals produced from the hydropyrolysis reaction. The pretreatment chemicals will be discussed hereinafter.

Under normal circumstances the waste black liquor entering the system from the kraft mill will be that coming from the soap skimmer and normally will have a temperature in the range of from 180° F. to 200° F. The material is added to pretreat the waste black liquor in treatment tank 20. It is preferable that the treatment tank be designed to provide a holding time of on the order of thirty minutes for the pretreatment of the waste black liquor. The high pressure pump 24 is designed to increase the pressure of the pretreated waste black liquor to a pressure in the range of from 1000 to 3500 lbs. per square inch. The operating pressure is controlled higher than the pressure of saturated steam at the chosen operating temperature in order to prevent flashing of the liquid. The cross heat exchanger 26 utilizes the product stream from the hydropyrolysis reactor 30 to bring the incoming waste black liquor up to an intermediate temperature and a final preheater 28 serves to bring the waste black liquor up to the reaction temperature, which is in the range of from 490° F. to 700° F. and to a preferable range of from 630° to 640° F.

The reactor 30 has been indicated only generally on the flow sheet and the preferred type of reactor is a tubular-flow reactor; however, by the same token a stirred-tank reactor might be utilized or a plurality of such reactors in series. The feed of the stream entering the reactor may be on the order of 610° F. and at this temperature, the reaction rate is normally rapid enough to insure a reasonable residence time requirement. The preferred residence time of the black liquor within the reaction zone is on the order of from 3 minutes to 3 hours to obtain the required results.

The reaction product leaving the reactor 30 is passed through the cross heat exchanger 26 by way of 31 to heat the incoming waste black liquor traveling to the hydropyrolysis reactor 30 and from there it is passed through a slurry cooler 32 and cooled down by cooling water which is passed through the cooler in heat exchange relationship as indicated. The temperature is reduced to in the range of from 150° F. to 300° F. at a constant pressure which is about that of the reactor 30. The reaction product includes a char-slurry mixture as well as noncondensable organic gases formed during the hydropyrolysis reaction. The reaction products stream is next passes through a pressure letdown valve 34 and introduced into a flash gas separator 36. For the sake of example, the reaction products stream, in passing through the pressure letdown valve 34, is reduced from about 2800 psig to about 4 psig. The action of the pressure letdown valve 34 is normally controlled by sensing the pressure of the waste black liquor stream between the high pressure pump 24 and the reactor 30. The flash gas separator 36 should operate at atmospheric pressure and as a result when the reaction product enters the separator 36, it is flashed at atmospheric pressure and the char-slurry mixture leaving the bottom of the flash gas separator 36 through line 45 is cooled to on the order of about 212° F. The noncondensable gases formed in the hydropyrolysis reaction and some water vapor leave overhead from the flash gas separator 36 through line 47. It is desirable, therefore, that there should be interposed some type of flash separator to receive these vapors and condense whatever condensable materials (such as water) are carried overhead by the flashing. Such a flash separator has not been shown in FIG. 1, but wil be appreciated by those skilled in the art.

A portion of the noncondensable organic gases produced in the hydropyrolysis reaction which pass overhead are combusted at 39 in the preheater 28 and serve the purpose of adding extra energy to the waste black liquor to bring it up to the desired reaction temperature when it enters the reactor 30. The rest of the gases are combusted in a boiler to produce steam. The burning or combustion of these noncondensable gases produces a mixture of gases which include sulfur dioxide, carbon dioxide and nitrogen. The noncondensable organic gases leaving overhead from the flash gas separator 36 and traveling to the preheater 28 include methane, ethylene, ethane, hydrogen sulfide, propane, $CH_3SH$, $C_4H_{12}$, $C_2H_5OH$ and $(CH_3)_2S$.

The gases of combustion which result at 39 in the preheater 28 are transported by way of line 42 and are introduced into the bottom of an $SO_2$ absorber 41. These gases include $SO_2$, $CO_2$, and $N_2$. The $SO_2$ absorber should be some type of contact tower which is satisfactory to absorb the $SO_2$ gas into a concentrated wash solution emanating from the char-slurry end of the system. In point of theory either a packed or tray tower is satisfactory to accomplish this end result.

The char-slurry mixture which is removed from the bottom of the flash gas separator 36 is transported through line 45 to a first vacuum filter 44 where the filtrate is removed from the char through 52. The filtrate from filter 44 includes a concentrated solution comprising $Na_2CO_3$ and $NaHCO_3$. The char is washed by wash water from line 46 which wash water originates from a fresh water source which washes the char at a second filter 48. The washing of the char at the first filter 44 produces a weak filtrate having the same chemical components as the filtrate leaving line 52, which is transported through line 49 to the top of the $SO_2$ absorber 41 where it is intermixed with the $SO_2$ gases from the preheater 28. The intermixing of the $SO_2$ gases with the weak filtrate from filter 44 proceeds generally along the line of the following reaction:

$$Na_2CO_3 + SO_2 \rightarrow Na_2SO_3 + CO_2$$

$$Na_2SO_3 + SO_2 + H_2O \rightarrow 2NaHSO_3$$

This SO$_2$ treated weak filtrate is then taken from the bottom of the SO$_2$ absorber through line 50 and introduced into what is referred to as an acid repulp tank 51 which tank also receives the char from filter 44. The acid repulp tank 51 is mechanically agitated and the purpose of mixing the char with the above described material from the SO$_2$ absorber is to remove sodium retained in the char. The reason for removal of the sodium from the char is that in the event of the sodium content of the char is quite high and the char is to be used as a fuel, the removal of the sodium at this point reduces the amount of ash resulting from the burning of the char.

The char-slurry mixture from the acid repulp tank is next transferred through line 53 to the second filter 48 where the filtrate is separated from the char and the char is washed again from the fresh water source and is then passed on for further processing. The filtrate passing through the second filter 48 is transferred through line 55 to the treatment tank 20 where it is utilized to pretreat the incoming waste black liquor which is subsequently transported to the reactor 30 where it undergoes the hydropyrolysis reaction. The mechanism of removal of the sodium from the char in the acid repulp tank 51 is thought to be essentially a reaction of the sodium bisulfite produced in the SO$_2$ absorber with a "sodium" group on the char to convert the "sodium" group on the char to an "OH" group with a subsequent conversion of the sodium bisulfite to sodium sulfite.

The reason for the pretreatment of the waste black liquor prior to its entering the hydropyrolysis reaction is to bring the Na$_2$S concentration of the filtrate leaving the filter 44 through 52 up to an acceptable level so that with the addition of the proper chemicals the filtrate from 44 can be converted from a green liquor to a white liquor suitable for the pulping of wood products in accordance with kraft pulping process technology. The conversion of the filtrate from filter 44 is essentially effected by reacting lime with the filtrate. Under normal circumstances only about 85% of the required sulfur for pretreatment is produced by burning the uncondensable organic gases at 39. The additional 15% required can be added to the gas stream in line 47 as elemental sulfur which can, also, be burned at 39.

The concept of direct absorption of SO$_2$ gas resulting from the combustion of various sulfur bearing gases into the waste black liquor can be utilized in pretreating the liquor but this concept is undesirable because it is also necessary to absorb carbon dioxide in the combustion gases and this is undesirable because if carbon dioxide is absorbed it reduces the pH which tends to precipitate lignin from solution. When this happens the lignin tends to clog the piping which is undesirable.

In the present disclosure carbon dioxide produced in the combustion in the preheater 28 is avoided in the black liquor because when the combusted gases are transmitted to the SO$_2$ absorber, the carbon dioxide simply passes out the stack 43 of the absorber because it is not absorbed in the weak filtrate coming from filter 44 through line 49.

In order to assist those skilled in the art in practicing the invention a material balance at various places in the flow sheet of FIG. 1 is given below in Table I. This material balance is given when a pH of 3.1 is present in the liquid flowing in lines 50 and 55. This material balance will change with a change in pH of stream 50. Amounts below are given in weight percent.

TABLE I

| LOCATION | SOLIDS | Na | S | C | TOTAL FLOW (lbs/hr) |
|---|---|---|---|---|---|
| 21 | 25.00 | 5.55 | 0.79 | 10.70 | 400.00 |
| 55 | 11.10 | 2.96 | 4.14 | 0.83 | 65.97 |
| 25 | 23.03 | 5.20 | 1.27 | 9.31 | 465.97 |
| 49 | 10.03 | 3.01 | 1.37 | 1.22 | 67.78 |
| 42 | 93.41 | — | 2.51 | 2.25 | 101.41 |
| 43 | 91.09 | — | 0.005 | 2.45 | 101.41 |
| 50 | 13.49 | 3.01 | 5.12 | 0.92 | 67.78 |
| 31 | 23.03 | 5.19 | 1.27 | 9.31 | 465.97 |
| 47 | — | — | — | — | 11.97 |
| 45 | 22.07 | 5.25 | 0.78 | 8.96 | 454.00 |

It will, thus, be seen from the above discussion of the invention in conjunction with FIG. 1 that within the closed system disclosed, a new and novel means has been provided for pretreating the waste black liquor which is to undergo the hydropyrolysis reaction, which pretreatment produces a filtrate that can be conveniently treated to put it in condition to be used as a pulping chemical and, also, serves to adjust the characteristics of the char produced in the hydropyrolysis reaction so that it is in its most convenient form. This concept is accomplished by taking the noncondensable organic gases resulting from the hydropyrolysis reaction, burning the same to produce heat which can be used in raising the black liquor to the hydropyrolysis reaction temperature, and then conducting the gases of combustion to an absorber where SO$_2$ is absorbed into a filtrate resulting from the washing of the char produced in the hydropyrolysis reaction. This absorption produces a mixture of sodium bisulfite and sodium sulfite which is introduced directly into the waste black liquor to pretreat the same or before introduction into the waste black liquor is utilized by mixing it with the char to reduce the sodium content of the char and is subsequently introduced into the waste black liquor to pretreat.

Figure 2:
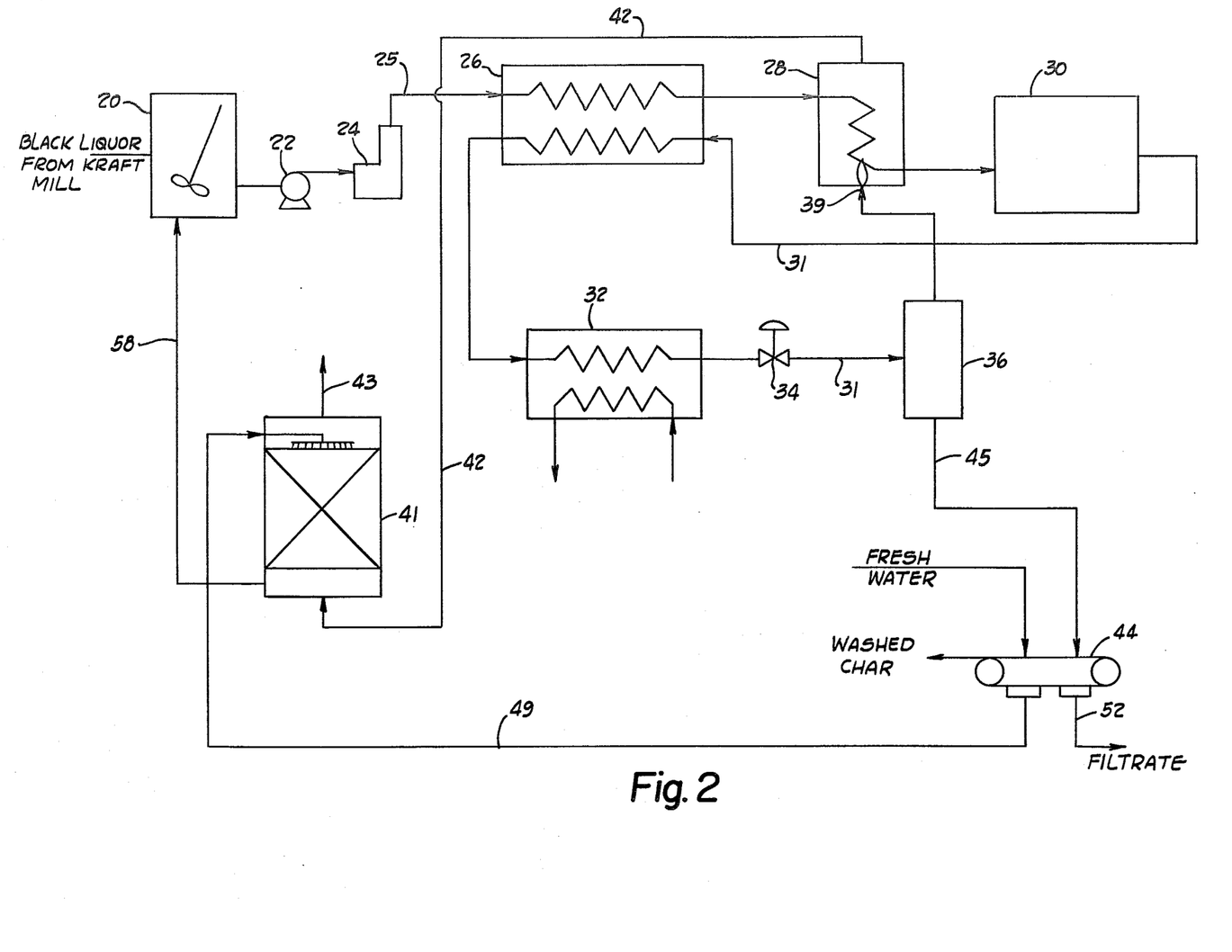
FIG. 2 is a flow sheet similar to FIG. 1, but showing an embodiment of the invention which omits the acid washing of the char.

FIG. 2 of the drawings is an illustration of the present invention where the sodium content of the produced char is such that it is at an acceptable level. In this instance it is not necessary to wash the char with the product produced in the SO$_2$ absorber and under these circumstances the sodium bisulfite produced in the SO$_2$ absorber 41 is directly introduced into the waste black liquor in the treatment tank 20 by way of line 58. Under these circumstances the flow sheet of FIG. 2 differs from FIG. 1 in that the acid repulp tank 51 and the second filter 48 have been deleted. In other respects, the system is the same in that the char-slurry product from the bottom of the flash gas separator 36 is passed directly to filter 44 producing a filtrate as indicated. The char as separated from the filtrate is washed with fresh water producing a weak filtrate which is transported to the SO$_2$ absorber 41 by way of line 49 where it absorbs and reacts with the SO$_2$ from preheater 28 to produce the sodium bisulfite.

Figure 3:
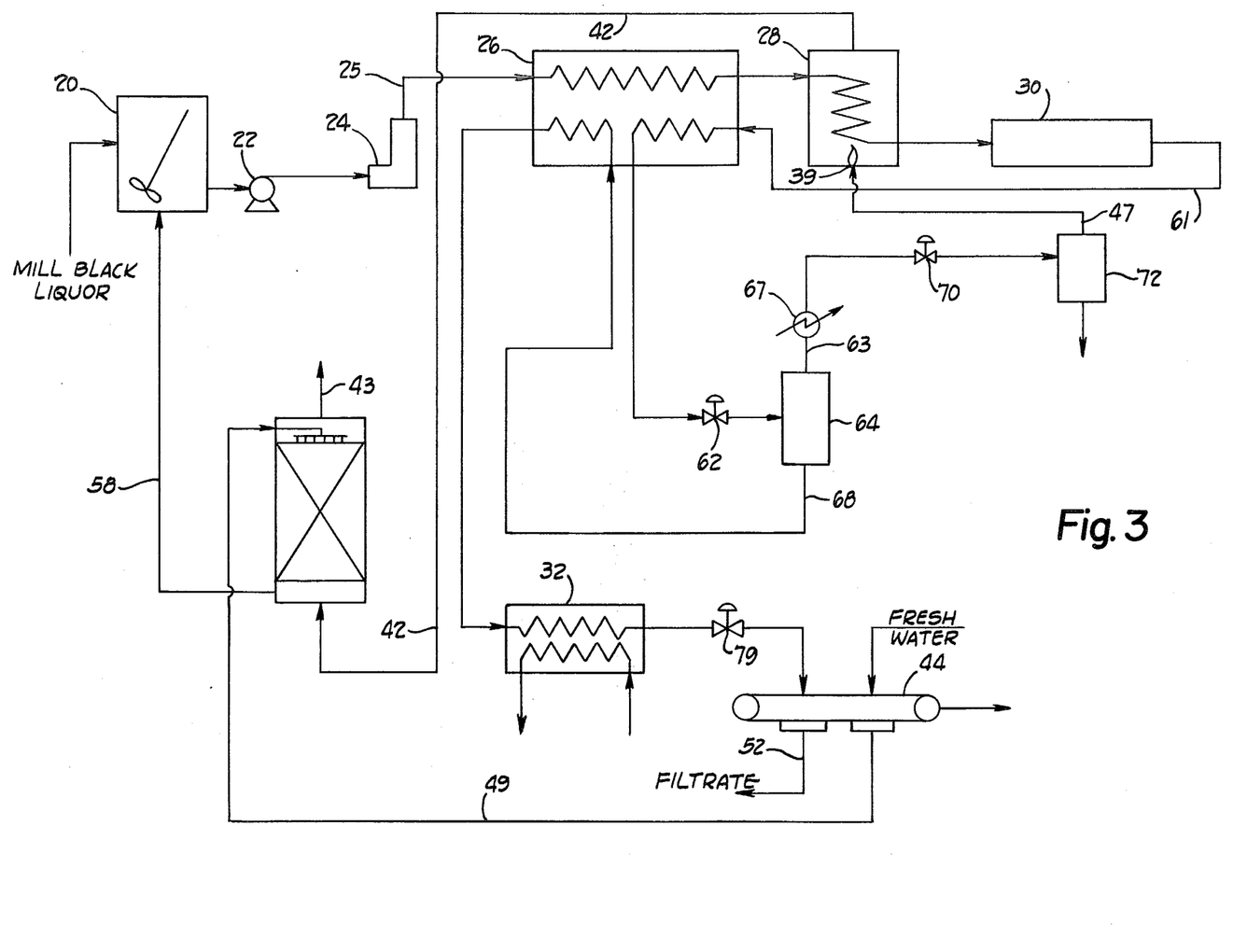
FIG. 3 is a flow sheet illustrating a modification of the invention illustrated in FIGS. 1 and 2 and shows an improvement in the pressure reduction system reducing the pressure of the material leaving the hydropyrolysis reactor with FIG. 3 omitting the acid washing of the char.

The flow sheet of FIG. 3 illustrates an improvement in the processes illustrated in FIGS. 1 and 2 and is best compared with flow sheet of FIG. 2 to aid in an understanding of the improvements made in FIG. 3. The improvement of FIG. 3 is in the pressure reduction system for reducing to atmospheric pressure the char-slurry reaction product leaving the reactor 30. The system of FIG. 3 improves the char-slurry composition which in FIG. 2 leaves the flash gas separator 36 through line 45. The improvement resulting in the process illustrated in FIGS. 3 and 4 produces advantageous results in that it reduces the organic carbon content in the filtrate which is regenerated to produce a kraft pulping liquor and, also, reduces the sodium bicarbonate level in the filtrate. Additionally, the sulfur level is reduced in the char which is quite advantageous in that when the char is utilized as a fuel, the amount of $SO_2$ resulting from burning is reduced.

Referring specifically to FIG. 3, the same identifying numbers have been applied to the components in FIG. 3 that have been shown in FIGS. 1 and 2 and which are the same; however, when variations in the structure have been utilized, new identifying numerals have been utilized.

It will be seen that the reaction product exiting the hydropyrolysis reactor 30 is transferred by way of line 61 into the cross heat exchanger 26 where a portion of its heat is given up to the waste black liquor prior to the liquor being subjected to the hydropyrolysis reaction. The cross heat exchanger shown herein is slightly different than illustrated in FIGS. 1 and 2, but for all intents and purposes it is the same and so, therefore, the same reference numeral has been used in identifying this element.

After the reaction product exits the cross heat exchanger 26 it travels to what has been identified as a first or number one pressure letdown valve 62 from whence it is introduced into a flash gas separator 64 sometimes referred to as a flash tank. A reduction in temperature and pressure results when the reaction products pass through the pressure letdown valve number one and are introduced into the flash gas separator 64. The temperature reduction is on the order of from 0° F. to 400° F. and the pressure reduction is on the order of from 500 to 3000 psig depending upon the pressure of the hydropyrolysis reaction taking place in the reactor 30. As the reaction products are introduced into the flash gas separator 64 at the high temperatures indicated and under only partial pressure reduction extensive flashing of the reaction products and a wet calcination reaction of sodium bicarbonate results. The flashing and wet calcination reaction reduce the temperature on the order of those referred to above.

The flashing vapor overhead is vented through line 63 to what has been referred to as pressure letdown valve number two 70. It is sometimes desirable to reduce the temperature of the flashing vapor and to the extent that the vapor need be cooled, a cooler 67 has been interposed in line 63. The second pressure letdown valve 70 reduces the vapor pressure to about atmospheric pressure in a condenser 72 and the condenser 72 serves the purpose of separating the noncondensable gases from the condensable liquids which comprise primarily water. The noncondensable gases are then transmitted by way of line 47 to the preheater 28 where they are burned at 39 in the manner indicated in the discussion of FIGS. 1 and 2.

The bottoms from the flash gas separator 64 which comprise primarily the char-slurry mixture are traveled through line 68 and preferably through the cross heat exchanger 26 to assist in heating the incoming waste black liquor prior to its entering the hydropyrolysis reactor 30. After the heat exchanger the char-slurry mixture is cooled to a desired temperature in the slurry cooler 32 to a temperature of on the order of from 120° to 212° F. The char-slurry is then passed through pressure letdown valve number three 79 and introduced to vacuum filter 44 where the filtrate is separated from the char and the char is washed by a source of fresh water.

The pressure reduction system illustrated in FIG. 3 acts at high temperatures (400° to 700° F.) and high pressures (1000–6000 psig). These high temperatures and partial pressure reduction causes flashing and a partial wet calcination reaction. The flashing appears to strip volatile organics and volatile sulfur compounds from the slurry. The wet calcination decomposes the sodium bicarbonate in the slurry to sodium carbonate. The high temperature of the initial pressure reduction causes the wet calcination reaction to proceed very quickly. The main decomposition reaction is believed to be:

$$2NaHCO_3 \rightarrow Na_2CO_3 + H_2O + CO_2$$

As mentioned above, this flashing procedure and wet calcination improves the filtrate and char produced in that the organic carbon and sodium bicarbonate in the filtrate are greatly reduced and the sulfur level in the char is reduced.

These improvements are important to a hydropyrolysis recovery system, because it is desirable to remove as much organic carbon and sodium bicarbonate from the filtered mother liquid (filtrate) as possible. The filtrate is returned to the mill operation for treatment to regenerate it into a pulping liquor and lowering the bicarbonate level reduces the amount of treatment that has to be used to regenerate the filtrate into a pulping liquor. The organics in the filtrate represent an unnecessary recirculation of materials and this is the reason for reducing the organics. Reduction in the sulfur level of the char is desirable particularly where the char is used by burning as a fuel.

A typical operation utilizing the modified pressure reduction system shown in FIG. 3 is illustrated in Table II below. In this case there was no slurry temperature reduction prior to the initial pressure reduction and the temperature was on the order of 600° F. The pressure was reduced 1000 psig into the flashing tank from a pressure of about 2500 psig. The flashing and wet calcination reduced the slurry temperature 50° F. The flashing operation concentrated the slurry but the filtrate still enjoyed a 1.7% reduction in organic carbon and a better than 20% decomposition of the sodium bicarbonate to sodium carbonate. The char produced had its sulfur level decreased by 17.9%.

TABLE II

| Without Pressure Reduction of FIG. 3 | |
|---|---|
| Filtrate | 2.37% organic carbon |
| Filtrate | 50.88 g/l $Na_2CO_3$ |
| Filtrate | 71.57 g/l $NaHCO_3$ |
| Unwashed Char | 3.13% Sulfur (DWB) |
| With Pressure Reduction of FIG. 3 | |
| Filtrate | 2.33% organic carbon |
| Filtrate | 76.32 g/l $Na_2CO_3$ |
| Filtrate | 56.50 g/l $NaHCO_3$ |
| Unwashed Char | 2.57% Sulfur (DWB) |

Figure 4:
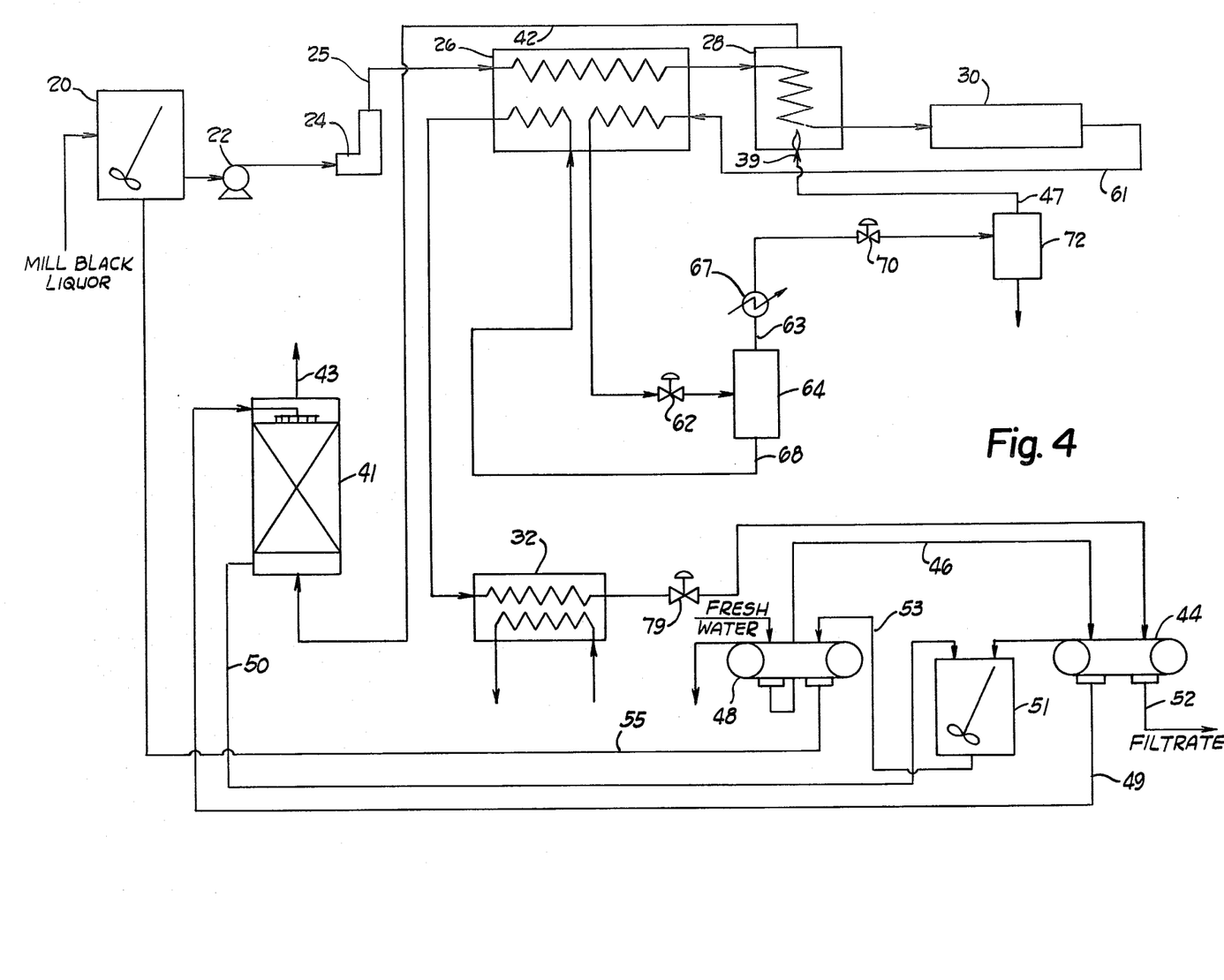
FIG. 4 is a flow sheet combining the pressure reduction system shown in FIG. 3 and the acid washing of the char illustrated in FIG. 1.

FIG. 4 illustrates the pressure reduction system shown in FIG. 3; however, it illustrates the incorporation of the pressure reduction system into the system found in FIG. 1, namely, the acid washing of the char that is produced in the hydropyrolysis reaction with the acid washing being accomplished by the sodium bisulfite produced in the SO₂ absorber 41. In all other respects, the pressure letdown system operates in the same manner as the system shown in FIG. 3 and the acid washing of the char is accomplished as illustrated in FIG. 1.

It will, therefore, be readily appreciated by those skilled in the art that the present invention discloses a unique process and system for pretreating the waste black liquor emanating from a process wherein any of various vegetative fibers may be digested by a pulping liquor wherein the pulping liquor's main active ingredients are sodium and sulfur. The waste black liquor is conveniently treated by chemicals produced as products of the hydropyrolysis reaction and by means of the pretreatment pulping chemicals recovered can be more easily and economically regenerated to a pulping liquor and the physical and chemical nature of the char and subsequent products produced from the char can be controlled within meaningful bounds.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. In the hydropyrolysis reaction of waste liquor resulting from the pulping of a vegetative fibrous structure which hydropyrolysis reaction includes the heating of the liquor under high temperatures and pressures to produce a reaction product including a char-slurry mixture, the improvement comprising the process of reducing the pressure of the reaction product to a pressure lower than the pressure of the hydropyrolysis reaction which causes noncondensable organic gases to vaporize and separate from the char-slurry mixture, combusting the noncondensable organic gases to produce materials including sulfur dioxide, separating the char-slurry mixture into a first filtrate and a char, washing the char with wash water to produce a second filtrate which includes sodium carbonate, mixing the second filtrate with the products of combustion of the noncondensable organic gases which include sulfur dioxide to produce a treated second filtrate which includes sodium bisulfite, and mixing the treated second filtrate with the waste black liquor prior to its subjection to the hydropyrolysis reaction.

2. In the process as claimed in claim 1, the step of washing the char with the treated second filtrate which includes sodium bisulfite to reduce the sodium content of the char and to produce sodium sulfite prior to mixing the so treated second filtrate with the waste liquor.

3. In the process as claimed in claim 1, wherein the pressure of the reaction product is reduced to about atmospheric pressure in one stage.

4. In the process as claimed in claim 3, the step of washing the char with the treated second filtrate prior to mixing the treated second filtrate with the waste liquor.

5. In the process as claimed in claim 3, wherein heat from the combustion of the noncondensable gases is used to heat the waste liquor prior to its undergoing the hydropyrolysis reaction.

6. In the process as claimed in claim 5, the step of washing the char with the treated second filtrate prior to mixing the treated second filtrate with the waste liquor.

7. In the process as claimed in claim 1, wherein the pressure of the reaction product is reduced to about atmospheric pressure in a plurality of stages.

8. In the process as claimed in claim 7, wherein heat from the combustion of the noncondensable gases is used to heat the waste liquor prior to its undergoing the hydropyrolysis reaction.

9. In the process as claimed in claim 8, the step of washing the char with the treated second filtrate prior to mixing the treated second filtrate with the waste liquor.

10. In the process as claimed in claim 7, the step of washing the char with the treated second filtrate prior to mixing the treated second filtrate with the waste liquor.

11. In the process as claimed in claim 1 wherein the waste liquor is from the kraft pulping process.

12. In the process as claimed in claim 11 wherein the hydropyrolysis reaction is carried out under a temperature of from about 490° F. to 700° F. and a pressure of from about 1000 psig to 3500 psig and for a time of from about three minutes to three hours.

13. In the hydropyrolysis reaction of waste liquor resulting from the pulping of a vegetative fibrous structure which hydropyrolysis reaction includes the heating of the liquor under high temperatures and pressures to produce a reaction product including a char-slurry mixture, the improvement of reducing the organic carbon and sodium bicarbonate content of the liquid component of the char-slurry mixture and reducing the sulfur content of the char including the steps of: introducing the reaction product into a first separation chamber through a first pressure reducing valve to reduce the pressure a first amount and whereat vapors pass overhead and the char-slurry mixture is removed from the bottom, transporting the char-slurry mixture to a first filter through a second pressure reducing valve which reduces the pressure to about atmospheric pressure and at said first filter the char is separated from the slurry to produce a filtrate which is usable in producing a pulping liquor.

14. In the hydropyrolysis of waste black liquor from a kraft pulping process wherein the liquor is passed through a cross heat exchanger under pressure and thereafter to a reactor where it is reacted at a temperature of from about 490° F. to 700° F. and a pressure of from about 1000 to 3500 psig for a time of from about 3 minutes to 3 hours to produce a reaction product including a char-slurry mixture and the reaction product is passed through the cross heat exchanger to heat the liquor prior to its introduction into the reactor, the improvement comprising introducing the reaction product into a flash gas separation chamber through a pressure reducing valve to reduce the pressure and whereat noncondensable organic gases pass overhead and the char-slurry mixture is removed from the bottom, burning the noncondensable organic gases to preheat the liquor prior to its entering the reactor which burning produces gases including sulfur dioxide, transporting the sulfur dioxide gas and introducing it into the bottom of an absorber, transporting the char-slurry mixture from the bottom of the flash gas separation chamber to a first filter where the char is separated from the slurry to produce a filtrate which is usable in producing a kraft pulping liquor, washing the char with wash water to produce a weak filtrate which includes sodium carbonate and which is transported to the top of the absorber and in the absorber is intermixed with the sulfur dioxide to produce a sulfur dioxide absorbed filtrate including sodium bisulfite, washing the char from the first filter with the sulfur dioxide absorbed filtrate from the absorber to produce sodium sulfite, separating the char from the sulfur dioxide absorbed filtrate including sodium sulfite at a second filter and then mixing the sulfur dioxide absorbed filtrate including sodium sulfite with the incoming waste black liquor prior to the waste black liquor being introduced into the cross heat exchanger, and washing the char with the wash water prior to the wash water being used to wash the char initially to produce the weak filtrate.

15. In the hydropyrolysis of waste black liquor from a kraft pulping process where the liquor is reacted in a reaction zone under a temperature of from about 490° F. to 700° F. and a pressure of from about 1000 to 3500 psig for a time of from about 3 minutes to 3 hours to produce a reaction product including a char-slurry mixture, the improvement of reducing the organic carbon and sodium bicarbonate content of the liquid component of the char-slurry mixture and reducing the sulfur content of the char including the steps of: introducing the reaction product into a first separation chamber through a first pressure reducing valve to reduce the pressure a first amount and whereat vapors pass overhead and the char-slurry mixture is removed from the bottom, transporting the char-slurry mixture to a first filter through a second pressure reducing valve which reduces the pressure to about atmospheric pressure and at said first filter the char is separated from the slurry to produce a filtrate which is usable in producing a kraft pulping liquor.

16. In the hydropyrolysis of waste black liquor from a kraft pulping process where the liquor is reacted in a reaction zone under a temperature of from about 490° F. to 700° F. and a pressure of from about 1000 to 3500 psig for a time of from about 3 minutes to 3 hours to produce a reaction product including a char-slurry mixture, the improvement comprising introducing the reaction product into a first separation chamber through a first pressure reducing valve to reduce the pressure a first amount and whereat vapors pass overhead and the char-slurry mixture is removed from the bottom, introducing the vapors which pass overhead from the first separation chamber into a second separation chamber through a second pressure reducing valve to reduce the pressure a second amount to about atmospheric pressure and in the second separation chamber noncondensable organic gases pass overhead and condensable materials are removed from the bottom, burning the noncondensable organic gases from the second separation chamber to preheat the liquor prior to its entering the reaction zone which burning produces gases including sulfur dioxide, transporting the sulfur dioxide gas and introducing it into the bottom of an absorber, heating the liquor prior to its introduction into the reaction zone with the char-slurry mixture from the bottom of the first separation chamber, transporting the char-slurry mixture after its use in heating the liquor to a first filter through a third pressure reducing valve which reduces the pressure to about atmospheric pressure and at the first filter the char is separated from the slurry to produce a filtrate which is usable in producing a kraft pulping liquor, washing the char with wash water to produce a weak filtrate which includes sodium carbonate which is transported to the top of the absorber and in the absorber is intermixed with the sulfur dioxide to produce sulfur dioxide absorbed filtrate including sodium bisulfite, and mixing the sulfur dioxide absorbed filtrate including sodium bisulfite with the incoming waste black liquor prior to the waste black liquor being introduced into the reaction zone.

17. In the process as claimed in claim 16, the step of washing the char with the sulfur dioxide absorbed filtrate to produce sodium sulfite prior to mixing the sulfur dioxide absorbed filtrate with the waste liquor.

* * * * *